United States Patent
Pettibone et al.

(10) Patent No.: US 9,069,349 B2
(45) Date of Patent: *Jun. 30, 2015

(54) DESIGN-TO-ORDER PERFORMANCE EQUIPMENT

(71) Applicant: ShapeLogic LLC, Carlsbad, CA (US)

(72) Inventors: Bruce Richard Pettibone, Carlsbad, CA (US); Carlos Horacio Caballero, Irvine, CA (US)

(73) Assignee: ShapeLogic LLC, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/039,164

(22) Filed: Sep. 27, 2013

(65) Prior Publication Data

US 2014/0025188 A1 Jan. 23, 2014

Related U.S. Application Data

(63) Continuation of application No. 12/975,244, filed on Dec. 21, 2010, now Pat. No. 8,548,620.

(60) Provisional application No. 61/288,529, filed on Dec. 21, 2009.

(51) Int. Cl.
*G05B 19/4097* (2006.01)
*G06F 17/50* (2006.01)

(52) U.S. Cl.
CPC ........ *G05B 19/4097* (2013.01); *G06F 17/5004* (2013.01); *G06F 2217/04* (2013.01)

(58) Field of Classification Search
None
See application file for complete search history.

(56) References Cited

U.S. PATENT DOCUMENTS

| 6,736,506 | B2 | 5/2004 | Izumitani et al. |
| 8,548,620 | B2 * | 10/2013 | Pettibone et al. ............... 700/98 |
| 2002/0052807 | A1 | 5/2002 | Han et al. |
| 2002/0188622 | A1 * | 12/2002 | Wallen et al. ............... 707/104.1 |
| 2005/0071935 | A1 * | 4/2005 | Shah et al. .................. 12/146 L |
| 2007/0180416 | A1 | 8/2007 | Hughes |
| 2008/0147512 | A1 | 6/2008 | Yankton et al. |

FOREIGN PATENT DOCUMENTS

| KR | 10-2000-0024593 A | 5/2000 |
| KR | 10-2000-0054640 A | 9/2000 |

OTHER PUBLICATIONS

PCT/US2010/061662; PCT International Search Report; PCT/ISA/210; Aug. 8, 2011, pp. 1-3.

* cited by examiner

*Primary Examiner* — Sean Shechtman
*Assistant Examiner* — Steven Garland
(74) *Attorney, Agent, or Firm* — Pillsbury Winthrop Shaw Pittman LLP

(57) ABSTRACT

Customization systems and methods are described in relation to performance devices and apparatus using a closed-loop feedback process for exploration, design and improvement of devices including performance devices. Crowdsourced knowledge bases, iterative improvements and centralized statistical, semantical and other technical analyses are employed to modify a baseline design. A baseline model defining modifications to a base device necessary to obtain a master device including modifications calculated to improve performance of the master device over the base device. Manufacturing instructions including CNC code can be produced and used to causes the production machine to manufacture the customized device. A design-to-order system is described as having of a simplified user interface, a queuing system, CAD/CAM capability and a repository of stored baseline models.

24 Claims, 9 Drawing Sheets

DESIGN-TO-ORDER PERFORMANCE EQUIPMENT

BACKGROUND OF THE INVENTION

Description of Related Art

As the complexity of processes used to fabricate increasingly sophisticated performance devices grows, users have become increasingly unable to modify and customize devices they use or intend to use. This inability arises for a variety of reasons, including (a) very complex design process, leveraging computer aided design/computer aided manufacture ("CAD/CAM") applications designed for the use of specialists, (b) a lack of clearly understood patterns and functions that correlate changes to a device with the performance changes they induce, (c) global distribution of the design, production and supply chain, and (d) a lack of processes and facilities for manufacturers to include the user in that chain, assuming they want to do so. Yet, users' expectations have grown to the point of demanding that such personalization be offered to them.

BRIEF SUMMARY OF THE INVENTION

Considered broadly, certain elements of equipment and devices can be produced as custom orders. In one example, surfboards can be customized according to a surfers individual needs. Other types of sports equipment (e.g. golf club putters), surgical implants and prosthetics and aerodynamically configured devices are commonly produced as standard order, but manual customization may be desirable.

Certain embodiments of the present invention provide systems and methods that may be accessed and remotely utilized using the Internet or other network to modify design specifications for devices and apparatus, wherein the design specifications control manufacturing of the devices or apparatus. Various aspects of the design specifications can be customized, including shape, dimensions and appearance. In some embodiments, systems and methods are provided for simulation and analysis that assist user selections between specification baselines, typically also generated using the system.

DETAILED DESCRIPTION OF THE INVENTION

Figure 1:
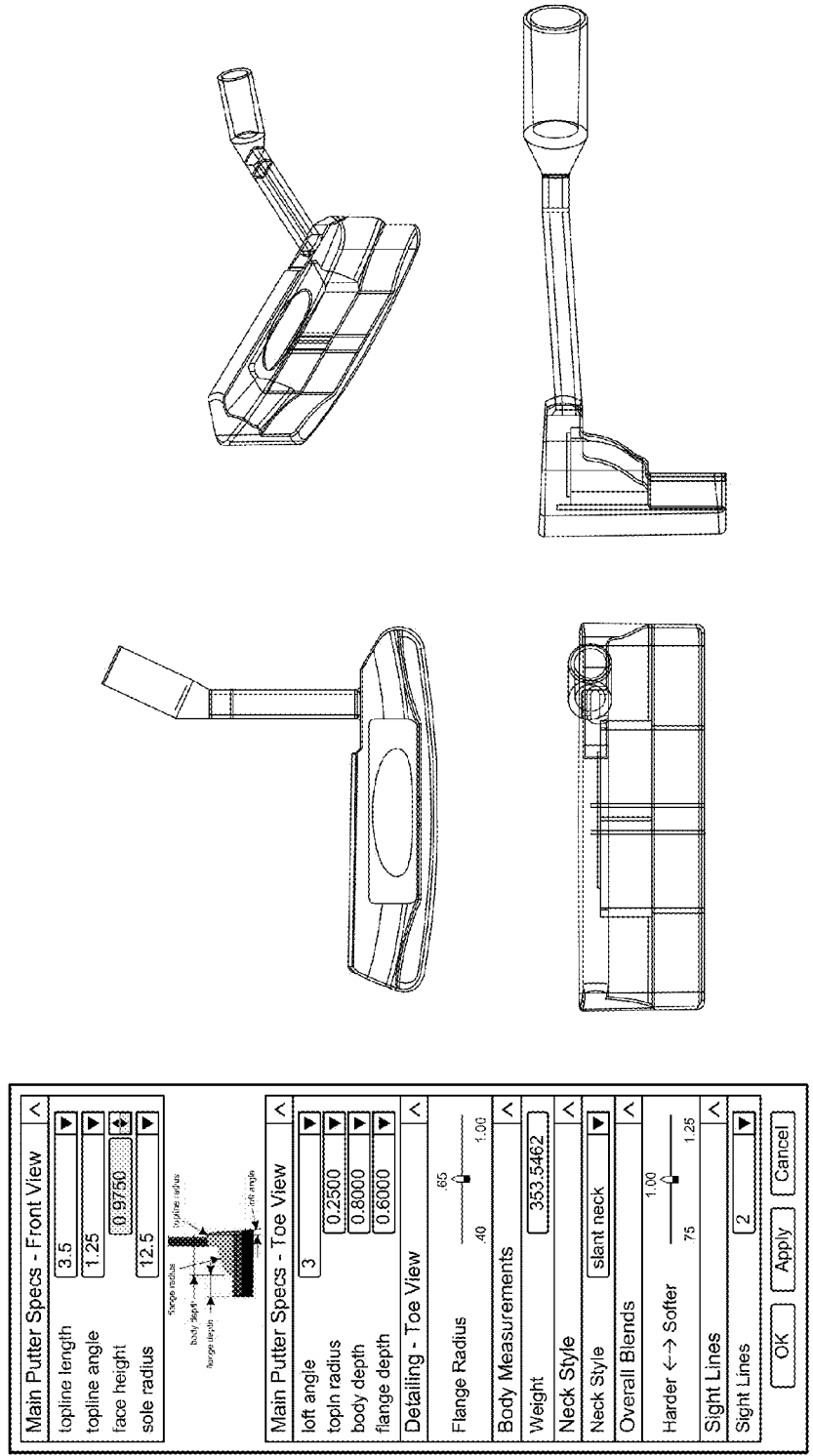
FIG. 1 shows an example of a user interface for customizing a golf club putter according to certain aspects of the invention.

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the components referred to herein by way of illustration.

Certain embodiments of the present invention provide systems and methods that may be accessed and utilized remotely using the Internet or one or more other networks to modify design specifications for devices and apparatus, wherein the design specifications control manufacturing of the devices or apparatus. Various aspects of the design specifications can be customized, including shape, dimensions and appearance. In some embodiments, systems and methods are provided for simulation and analysis that assist user selections between specification baselines, typically also generated using the system.

Certain embodiments of the invention provide systems and methods that permit users and specialists to leverage existing social networks by, for example, seeking other users with similar needs, "crowdsourcing" the baselines, specifications and knowledge resources and collaborating in the design process. As used herein, crowdsourcing is understood as the outsourcing of one or more tasks to a networked group or community in order to capture a broader range of expertise and problem-solving skills, particularly by soliciting solutions to a problem or performance of a task. One or more offered solutions may be adopted using a selection scheme based on voting, user, peer or expert review, assessment of expertise of the provider of the solution, simulation and/or by any other suitable selection strategy. The use of social networking for such activities can enable optimization of the design and design processes and leverage a collective know-how related to the devices and apparatus and the effect of the design changes in performance of the devices and apparatus. Certain embodiments of the invention can produce manufacturing data that facilitates and/or enables manufacture of the customized devices and apparatus.

In summary, certain embodiments of the present invention comprise one or more of:

(1) a web-based system that enables users to participate in the design, customization and fabrication process regardless of physical points of presence of factories and other facilities of a manufacturer;

(2) a streamlined process that allows users, design and manufacture specialists and expert users of a device or type of device to locate, connect and/or communicate with each other and to collaborate amongst themselves to produce customized designs;

(3) user interfaces that provide a user experience capable of reducing complex device modeling, design choices and engineering tasks into simple selections that can be made with simplified interface gestures and with access to knowledge and assistance based on the knowledge (including group knowledge) through the design and customization process, such information relating the anticipated and measured correlation of modification with change in performance;

(4) a server-based process configured and adapted to perform statistical, semantic and fuzzy logic data mining as well as physical/material engineering analysis and simulation, as users produce design baselines and collaborate on them, increasing the amount of data available to the user at any given time;

(5) a knowledge base that informs the closed-loop feedback process, and grows in value as more and more baselines are produced and crowdsourced;

(6) A CAD/CAM server architecture, which supports the manufacturing automation process with assistive data related to tool-paths, fixtures, assistive hardware, and much more, so that the user requesting the manufacture of a device eliminates all intermediary difficulties regardless of the manufacturers' or marketers' ability to attend to the process themselves.

Certain embodiments of the present invention comprise systems and methods used for design-to-order performance equipment and/or devices. In one example, systems and methods utilize a web-based user interface on a web-enabled device that gathers input from the user. It is contemplated that other networks and communication methods may be employed as appropriate and necessary to obtain a desired degree of system performance. For example, portable computing devices, including wireless telephones, gaming consoles, tablets, media players, etc., may be used where portability is desired. An expert system can be used to provide guidance related to choices available to a system user including, for example, assistance in selecting a model, template or master with which to begin. Additionally, the user may consult an online user community for crowdsourced information to help decide upon an appropriate master to begin with. In one example, a social networking systems can provide a communication framework in which compatible community members can be identified and approached.

In certain embodiments, the user interface provides user access to a set of tools that can be used to manipulate a master or baseline model. The terms master model and baseline model will be used interchangeably herein. The model typically comprises parameters that are applied to a base model of the thing to be customized. The base model may follow a particular style and/or embody certain functional elements that can be configured, customized and otherwise adjusted. For example, a curved edge may be shortened or lengthened to suit a user's biometrics by selecting parameters of the chord function that defines the edge. The chord function is typically defined in relationship to other elements of a surf board, wing, or other performance surface of a customizable device. In some embodiments, the baseline model comprises a set of customized parameters for the underlying base model. The baseline model may be based on a proven device developed for a specific application. For example, a baseline model may provide a set of parameters that can be used to produce an identical copy of a golf club used by a professional golfer during a successful season. A user may select the baseline model as a basis for designing a golf club customized to the biometrics and skill level of the user. In a simple example, a right-handed golfer may select mirror transform to adapt a left-handed golfer's baseline model for personal use. Typically, the golfing user in the example provides biometric information such as height, weight, fitness level, relative strength and golf handicap. An automated process may be executed to compare the user's biometrics with the professional golfer's biometrics in order to obtain a transform function and/or transform parameters used to calculate changes to the baseline model that will produce an equivalent club for the user. For example, if a key factor of the club relates center of gravity to club head weight, then a club customized for a user taller than the professional golfer recalculates the club head weight based on the change in center of gravity caused by lengthening the club.

In certain embodiments, two sets of translations are required. A manufacturing translation of base club to final customized device enables manufacture of the device. Manufacturing parameters typically replace parameters used to manufacture the base model. In certain embodiments, manufacturing parameters are generated for the baseline model and a second set of parameters is provided to convert the baseline model to a customized device, the second set of parameters including parameters calculated from the differences in biometrics of the user or differences in dimensions, displacement or other specifications of the desired customized device.

In some embodiments, transformations are calculated from handcrafted devices. For example, a baseline model may be developed by design processes known in the art, augmented by empirical adjustments obtained from, for example, modeling a wing or other aerodynamic component and subsequent testing a wind chamber. The transforms and transform parameters may therefore comprise engineered parameters and parameters adjusted based on testing. A customization transform and associated transform parameters may be calculated based on known relationships related to biometric or other differences. These relationships may be known or learned from massive community testing and results. In the example of a surf board, feedback from users of a customized board maybe aggregated and analyzed to adjust and improve the transforms.

In certain embodiments, the number of parameters in a model that are available for modification by a customization process can limited by the design skill and experience of the user. Certain design rules can be defined for different skill levels, whereby the adjustment of one parameter by the user automatically results in the change of related parameters. The resultant changes can be presented in a graphical representation of the final customized board.

It will be appreciated that performance devices are often characterized by a large number of parameters. The use of baseline models may preconfigure many of the parameters, and can significantly reduce the number of degrees of freedom provided a customizing user because, typically, the baseline model has some fixed relationships that provide benefits in performance. For example, a curved surface may be restricted to a range of curve radii and selection of the radius may be sufficiently related to other parameters that adjustment of the radius may be restricted to a limited number of users.

Transforms, parameter ranges and other information can be optimized using statistical analysis of feedback provided by large populations of users. In the example of a golf club, a large of users of a club customized from the same baseline model may report loss of distance under certain wind conditions; a combination of statistical analysis, semantical analysis, fuzzy logic, further testing and modeling may indicate a change in club surface to modify ball spin. Changes in certain parameters may have a common effect in devices based on different baseline models. Such commonalities can be modeled, enabling sharing of knowledge between such different devices.

Certain embodiments of the invention provide systems and methods for crowdsourcing improvements to a performance device. Certain of these embodiments comprise providing a baseline model to one or more of an enthusiast, a user and a manufacturer in a community of interested parties. In certain embodiments, the community performs one or more of analysis, comment, test, review, annotate and socialize the baseline model or a customized device based on the baseline model. In certain embodiments, the community receives a representations of individual device baselines via virtual 3D instances, spec sheets, and/or parametric reports. In certain embodiments, the community receives knowledge items associated with the individual baseline via metadata. In certain embodiments, the metadata includes complementary knowledge about the device baseline created by the process servers as a result of the design process, such as estimation of the effects that the individual changes made to the baseline are expected to have on the original performance profile of the device In certain embodiments, the metadata includes technical analysis of baselines, including one or more of a hydrodynamic flow, computational fluid dynamics, finite element analysis and/or derived findings and correlations that emerge. In certain embodiments, the findings include parameters that have no influence in the performance variable desired, or identifying parameters that have commanding performance consequences. In certain embodiments, the metadata includes recommendations and patterns derived from statistical analysis of large sets of historic data provided by users, server-based technical analysis tools and other types of experiential knowledge bases (e.g., professionals' opinions).

Certain embodiments of the invention provide a standards based social networking application that enables customization of performance devices. A software application implemented using OpenSocial and/or any other Social Networking standards for such applications, so that users and specialists interested in a particular device performance profile can find and engage other users with similar interests, and optionally access already existing improved baselines and their supplementary information Certain embodiments of the invention provide systems and methods for statistical and semantic analytics. A method for statistical and semantic analysis of the social graph for each community, its User-Generated-Content (UGC) in the form of both quantitative survey responses and qualitative experiential data, and other aggregated resources (e.g., industry-specific feeds, reviews, professional opinions, etc.) used to generate assistive correlations that can be used during the design session (Claim 1) and the associated grammar, ontology and taxonomies used for knowledge representation.

In certain embodiments a technical and engineering analysis is performed. An automated generation of technical analysis and simulated tests (e.g. hydrodynamic flows, Computational Fluid Dynamics, Finite Element Analysis, etc.) of device baselines, and their association via metadata to individual device baselines may be performed. A web-based application for any and all crowdsourced designs, and their supplemental data, to be made available to manufacturers for possible licensing.

It will be appreciated that the presently described systems and methods may be used to obtain vanity customizations. Users can select any existing baseline to which they have access, and can further customize the baseline with vanity customizations such as name impressions, custom graphics, colors, finishes, etc., prior to ordering a copy of the customized device from a manufacturer.

Certain embodiments of the invention provide a multi-user queuing mechanism by which multiple concurrent users undergoing design sessions can work individually without effect of contention on each other, and the baselines they create be queued for processing independently and/or anonymously of the users.

Certain embodiments of the invention provide knowledge-based assistive process for new users in order to leverage the large amounts of knowledge created by the system, its users and the communities of enthusiasts, to guide new users through the selection of a new baseline and the resulting association to any existing community of enthusiasts and/or the creation of a new community. The system can broadcast to other potentially interested users and may invite membership of the community.

Certain embodiments of the invention provide for automated creation of baselines whereby new "master" baselines can be created. For these new baselines, no "ancestors" need exist in the baseline version list. Creation of the new baselines may be automated by fitting previously generated parametric models to existing devices represented by any combination of laser scans, white or colored light scans, CT-scans, MRI, topographic profiles, etc. Certain embodiments of the invention provide for manufacturing optimization whereby requests for manufacturing are automatically routed, and their specifications and manufacturing-assistive data delivered via Internet, to the best qualified manufacturer, based on location, capabilities, machining types required, etc.

In order to support broad based user input, certain tools may be provided that allow users to access models, customization transforms and prior results and simulations. The user can make selections based on the available knowledge base and based on information provided by tool assistants, rule checkers and visual inspection of graphical representations of the customized device. In one example, the user may drag an end of the device in the image to extend or reduce a dimension of the device. Other dimensions of the customized device are typically changed automatically to maintain consistency with key features of the baseline model. The user-selected change and related parameter changes are typically grouped and provided as user input data to the design system.

In certain embodiments, user input data can be processed, interpreted and/or passed to a CAD modeling system. A queuing system may be used to manage multiple requests. A specific CAD model can be made active and updated using the user input data. Results from the update may be returned to the user in various forms which can include a 3D model, an image of multiple views of the model, 2D drawings, a report of mass properties, a meshed model for analysis, CNC toolpath data for machining, and/or a sliced model for additive fabrication. The 3D model can be used for interactive customization of art and graphics using physically correct lighting and photorealistic visualization. The results may be combined with a knowledge base in order to produce simulations for review by the user.

In some embodiments, 3D and other processing-intensive functions can be performed using centralized computers. For example, a smartphone may be able to display streamed models of the device and/or rendered images that can be controlled to simulate motion. Other functions provided in the system may be best provided in a centralized manner. For example, finite element analysis responsive to changes in parameters of the model may be optimally performed in a dedicated multiprocessor system.

A simplified user interface which gathers user input can be customized based on the sophistication level/needs of the user. Users can include end users of various skill and knowledge, manufacturers, expert enthusiasts and novice enthusiasts. The system typically allows an individual to customize a piece of equipment to suit their personal needs and desires, and/or to conform to design goals identified in a crowd-sourced or other design task. In certain embodiments, a known piece of equipment is selected as a starting point for a design and, typically, the known design serves as a master. Predefined parameters of the master can be modified by the user and the 3D model may be updated and returned to the user in various forms and formats. The user can evaluate the model in 3D, and/or create additional baselines for comparison/evaluation. Desired models can then be used for customizing art and graphics interactively. Optionally, computer aided analysis and/or simulation can be performed on 3D models to further evaluate appropriateness of new design baselines.

In certain embodiments, users of the system include individual enthusiasts and/or manufacturers of equipment. Individual enthusiasts may choose to use a design-to-order system because there are insufficient standard choices available to allow a good match with their physical attributes or ability level. Users may simply wish to be able to put their own 'thumbprint' on equipment and may wish to choose changes in shape, size and/or other appearance.

In certain embodiments, the user or specialist may participate in an online community using social networking such as a Facebook application or other means to obtain or share information about a product being customized. Such information can include parameter sets used to create certain baselines and performance aspects realized correlating to specific baselines. Massive feedback can be potentially be obtained from such sources and data collectively stored. Data can be analyzed using any suitable tools, including statistical analysis and fuzzy logic. Information derived from the feedback can be aggregated and maintained in a knowledge base. Communities of similarly situated people can collaborate to arrive at beneficial designs. In one example, left-handed golfers whose height is between 5'8" and 6'0", who are between 18 and 30 years of age, and who tend to shape their iron shots from right to left may be formed into a community of interest. Manufacturers may choose to use a design-to-order system to accommodate customer requests for non-standard offerings of equipment, or to expand their line of standard offerings by generating additional baselines of their equipment.

In certain embodiments, the herein-described design-to-order system allows customization and personalization of sports equipment and devices through a network that can be accessed using a computing device. Sports equipment and devices can comprise surfboards, surfboard fins, golf clubs including putters, wedges, irons, woods, utility clubs, cricket bats, hurling sticks, hockey sticks, baseball bats, bicycle frames, tennis rackets, wakeboards, kiteboards, skateboards, etc. In certain embodiments, the herein-described design-to-order system allows customization and personalization of medical equipment that can comprise surgical implants including hip replacement joints, knee replacement joints, shoulder replacement joints, limb prosthetics, dental prosthetics, cosmetic implants, and so on. In certain embodiments, the herein-described design-to-order system allows customization and personalization of devices and apparatus related to vehicles, which can comprise wheels, rims, custom engine parts and cosmetic trim. In certain embodiments, the herein-described design-to-order system allows customization and personalization of aeronautic and hydronautic devices, which can comprise wings, vessels, fuselages, hulls, rocket nozzles, fairings, propellers, rudders, cowlings, etc.

Figure 6:
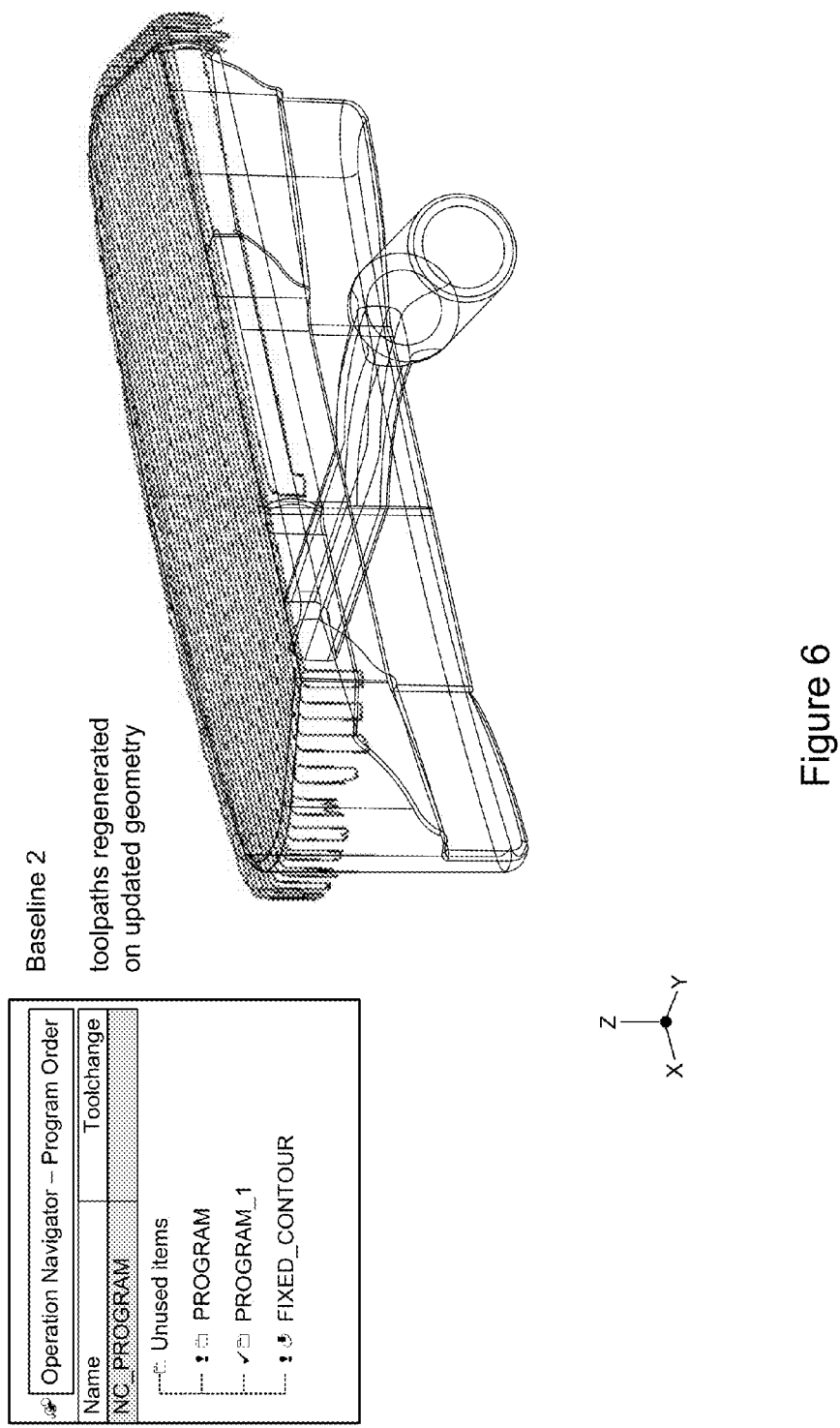
FIG. 6 illustrates a regenerated toolpath used to produce a 'design-to-order' putter.

In certain embodiments, shape, size, weight, volume and other performance related values can be changed, as can appearance such as art and graphics. Typically, a complex 3D CAD model is ultimately modified. A sophisticated modeling system may create a complex model that, in conventional systems, would not be modifiable except by persons highly skilled in use of such a program. An advantage of the system is the simplification of an interface that can be understood by users of specific equipment as is shown in FIG. 1. FIG. 1 shows an example of a user interface for customizing a golf club putter according to certain aspects of the invention. Parameter values are at one end of the range of acceptable values which is controlled in the interface. Such an interface can be tailored and configured for use by persons of various levels of expertise with the equipment/device. After a design-to-order piece of equipment or device is generated, various types of analysis can be performed to help determine usefulness and/or performance attributes of the new design baseline. After the user is satisfied with the new design baseline, the piece of equipment can be manufactured by various methods including CNC machining or rapid manufacturing methods (e.g. additive or subtractive rapid prototyping using materials such as resins, plastics, nylons, or metal). The piece itself may be fabricated, or perhaps a mold may be made from which the piece is manufactured. In certain embodiments, a change in CAD model geometry can signal the manufacturing system that manufacturing data needs updating. This may include such data as CNC toolpaths, as shown in FIG. 6, or rapid prototype machine input or instructions. A web enabled device based user interface can display a version of the equipment to be modified such as a surfboard or golf club putter along with a set of parameters modifiable within ranges as shown in the example of FIG. 1. The particular value of a parameter may affect the allowable range of other parameters. A subsystem such as expert system software or a knowledge base may help guide the user through the set of parameter choices by asking questions that might include physical attributes (height, weight, length of inseam, shoe size, reach, hat size, etc.), ability level (professional, expert, beginner, novice, etc.), and types of conditions anticipated (big waves, small waves, beach break waves, right point waves, left point waves, etc.). A subsystem, which can include, for example, expert system software and/or a knowledge base, may be used initially to help or direct the user to select a master from a library of existing models, e.g. surfboards or golf club putters or replacement hip joint. The selected master is typically the model that most closely resembles the model desired by the user and/or that is likely to best serve as a starting point in the creation of a desired personalized piece of equipment/device. In some embodiments, the user may simply pick from an existing library of customizable models of the equipment type of interest.

Figure 8:
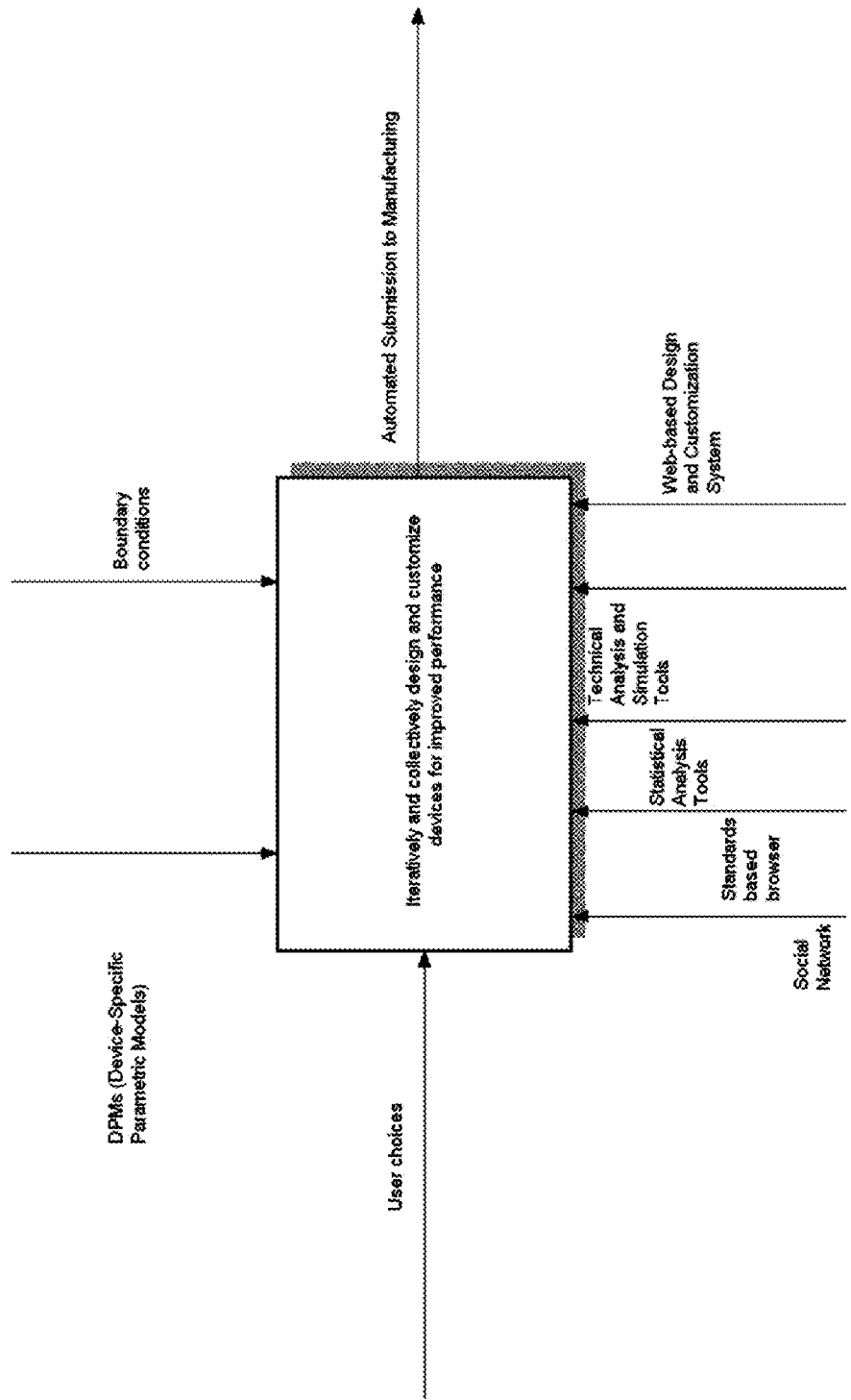
FIG. 8 is a flow chart that illustrates an iteratively and collectively designed/customized device.

When the user has defined the custom set of parameters, data can be sent to a computer system, which may comprise a server, a server farm, a computing cloud or other system that can manage and process a queuing system and the CAD system. A queuing system may be employed to manage requests and to pass user defined parameters to the CAD system. The CAD model is updated, as shown in FIG. 8 based on the requests and parameters. After update, a predetermined set of outputs may be returned to the user and/or saved on a server. Outputs can include a 3D model (e.g. a neutral format such as ICES or STEP), a lightweight CAD model (e.g. 'JT' or 'eDrawing'), a 3D rotatable object (e.g. 3D PDF, or Quicktime VR, or a java based object), an image of various views, 2D drawings, a polygon file for use with a rapid prototyping machine, a meshed file for use with an analysis software system, CNC toolpath code, and so on.

In certain embodiments, the user can evaluate an updated model using a 3D viewer. The updated model may also include information such as weight, volume, mass properties (e.g. center of gravity, moments of inertia). The user can evaluate the new design baseline visually. In some embodiments, a subsystem such as a software expert system or knowledge base, can be used to assist the user determine if the original design intent has been met, based on results returned with the updated model. Whether the design intent has been met or not, the user can typically repeat the process and create other customized design baselines with new sets of parameters. Typically, the user can also choose to save each baseline into a database that maintains customized design baselines.

Figure 2:
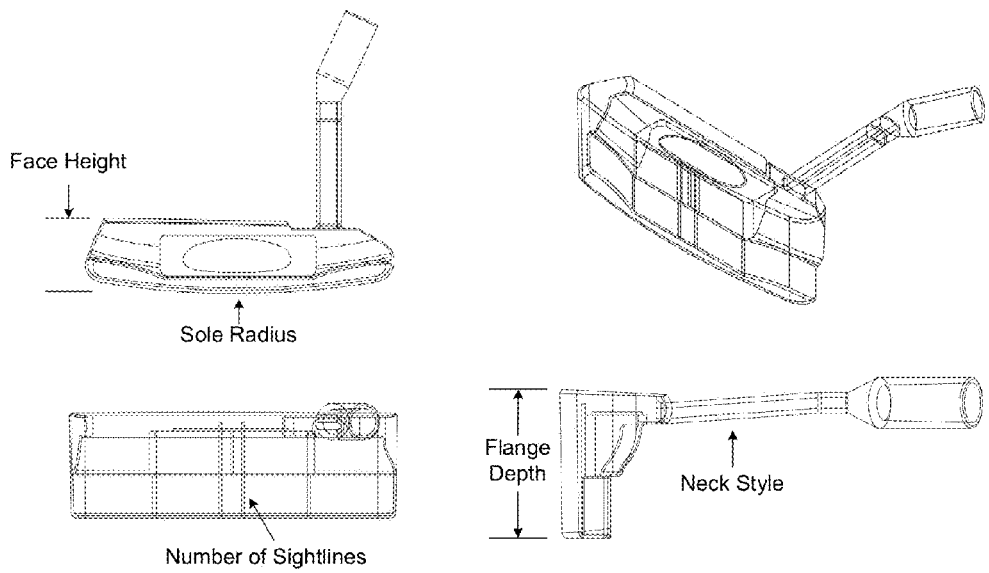
FIG. 2 provides a comparison of an original master putter with a 'design-to-order' putter according to certain aspects of the invention.
Figure 2:
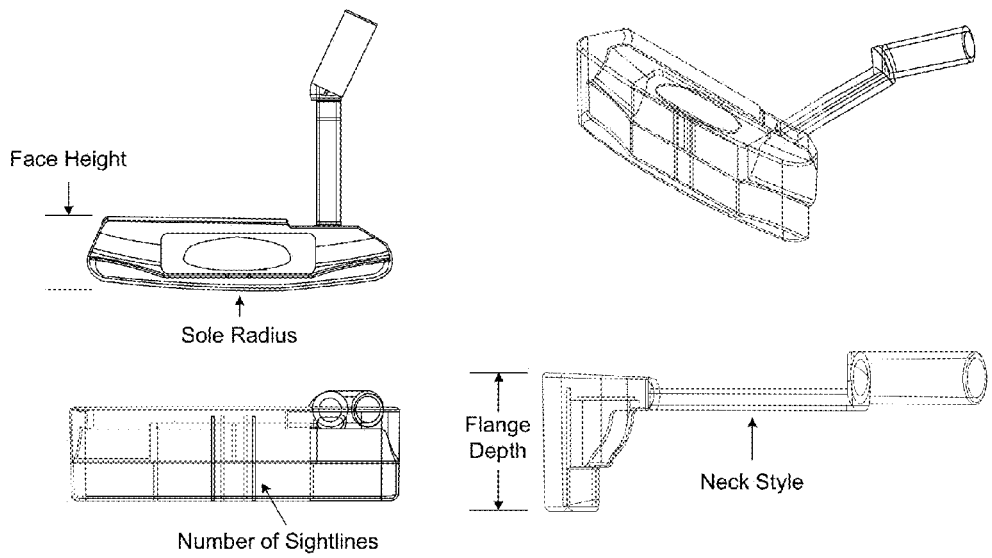

When the user returns to use the system again, the user can choose to be reminded of some or all of their previous baselines, perhaps even beginning a new design-to-order session using a previous baseline as a starting point or master. Certain advantages can accrue from such re-entry. In the example of the surfboard world, sometimes a board turns out to be a "magic board", one that has exceptional performance characteristics. If a previously saved surfboard was deemed to be a "magic board", it can be precisely reproduced: i.e., the same toolpaths that machined the original "magic board" can be output. In some embodiments, multiple baselines can be generated and a comparison is performed. Comparisons may be made using a side by side visual evaluation, as shown in FIG. 2, using multiple 3D viewers to simultaneously display a plurality of 3D models for visual comparison, and/or by a comparison of certain key data, such as center of gravity, moments of inertia, volume, weight, etc. Scale model rapid prototypes can be generated for evaluation. FIG. 2 provides a comparison of an original master putter with a 'design-to-order' putter, in which parameters are changed to the opposite end of the range of acceptable values of the master putter.

For more in-depth performance prediction evaluation, or strength evaluation, various types of computer simulation analysis can be performed on the design baselines. Finite element modeling can help to determine stresses or breaking points. Elaborate computational fluid dynamics or multiphysics analysis can help predict the performance of a surfboard, rudder, hull, etc., under various conditions (e.g., angle of attack, speed, wave velocity, water density, etc.). In the example of surfboards, surfboard fins may be included on the surfboard for a more complete analysis. The fins themselves might be customized in the same way the surfboard was customized. The results of these more sophisticated methods of analysis and comparison of results of multiple design baselines can give the user more confidence in his/her choice of customized equipment/device before making a decision on which to have manufactured. After a decision is made on the geometry/shape of the piece of equipment, then the user may have the option to modify the appearance, the art and graphics, to further customize/personalize to the user's liking. This can include selection of options such as choice of finishes, paints, accents, logos, lettering, decals, textures, etc. There may be a variety of predetermined options to choose from, or the option to upload personally selected and/or created art and graphics. A user interface can facilitate placement, sizing, morphing, rotation, etc. to achieve the desired final look. A high quality rendering system can render the 3D model interactively over the internet, or local net, and the look can be evaluated using 3D rotation, zoom, scale, pan, zoom, etc. The imagery can be so photorealistic that the user can be fairly certain of what the customized and/or personalized piece of equipment will look like before a decision is made to have it manufactured.

In certain embodiments a subsystem can present the user with an itemized cost summary detailing cost estimates based on all of the custom options chosen during the design-to-order process. In some embodiments, a piece of equipment used to win a significant competition, such as The Masters tournament, the Tour de France, etc., can be made available as a master very shortly after the competition ends, and customers can customize this proven design to their specifications and personal characteristics. The customer may also modify the art and graphics in order to personalize the equipment according to their needs and/or desires.

Recognizing that manufacturers may have various manufacturing facilities around the globe, utilization of a design-to-order system according to certain aspects of the invention can divert the production of custom equipment to the nearest facility. In some embodiments, the various types of manufacturing data generated by the system (CNC toolpaths, rapid prototyping data, etc.) can be provided to additional outsourced manufacturers as necessary to meet an order within an agreed manufacturing deadline. Custom art and graphics can be computer produced for application onto the design-to-order equipment. Returning to the example of a surfboard, a specialty cloth can be printed on, and then used during the lamination process. In the example of a golf club putter, toolpaths can be generated to engrave art onto the club during the machining process. In the example of a bicycle frame, decals can be computer printed.

In certain embodiments, various levels of collaboration can be enabled using the Internet or another network. For example, a user can share a design baseline and its various forms of output with friends, fellow enthusiasts and/or a specialist in the field of analysis. Sharing can be accomplished and controlled through a variety of social networks and custom applications. In one example, a computer session screen sharing system may be used for collaboration. However, to achieve a high level of sharing, the user or specialist may participate in an online community using social networking such as a Facebook application or other shared collaborative application to obtain or share information about the product being customized including parameter sets used to create particular baselines and performance aspects realized correlating to specific baselines. The shared collaborative application can be used to disseminate models and parameters to a large community of interested collaborators. The collaborators may be vetted, authenticated or otherwise screened in order to filter inappropriate, inaccurate, random and/or arbitrary contributions. Trusted collaborators may be identified and prioritized, whereby the system can tag or otherwise associate previous valuable contributions of a collaborator. Prior contribution to the field can be used to prioritize or weight contributions.

Collaboration may be vetted by aggregating input from large numbers of collaborators, whereby frequently proposed contributions are prioritized. Collaboration may include feedback that identifies successes and failures of similar customizations. Collaboration may be obtained from archives of suggestions and contributions made for related customization projects. Massive feedback can be potentially be obtained from such sources and data can be aggregated and collectively stored. Data can be analyzed using statistical or fuzzy logic into a knowledge base. Over time, communities of users may evolve into more and more specific groups of equally different people which can lead to more and more specifically beneficial information.

Figure 7:
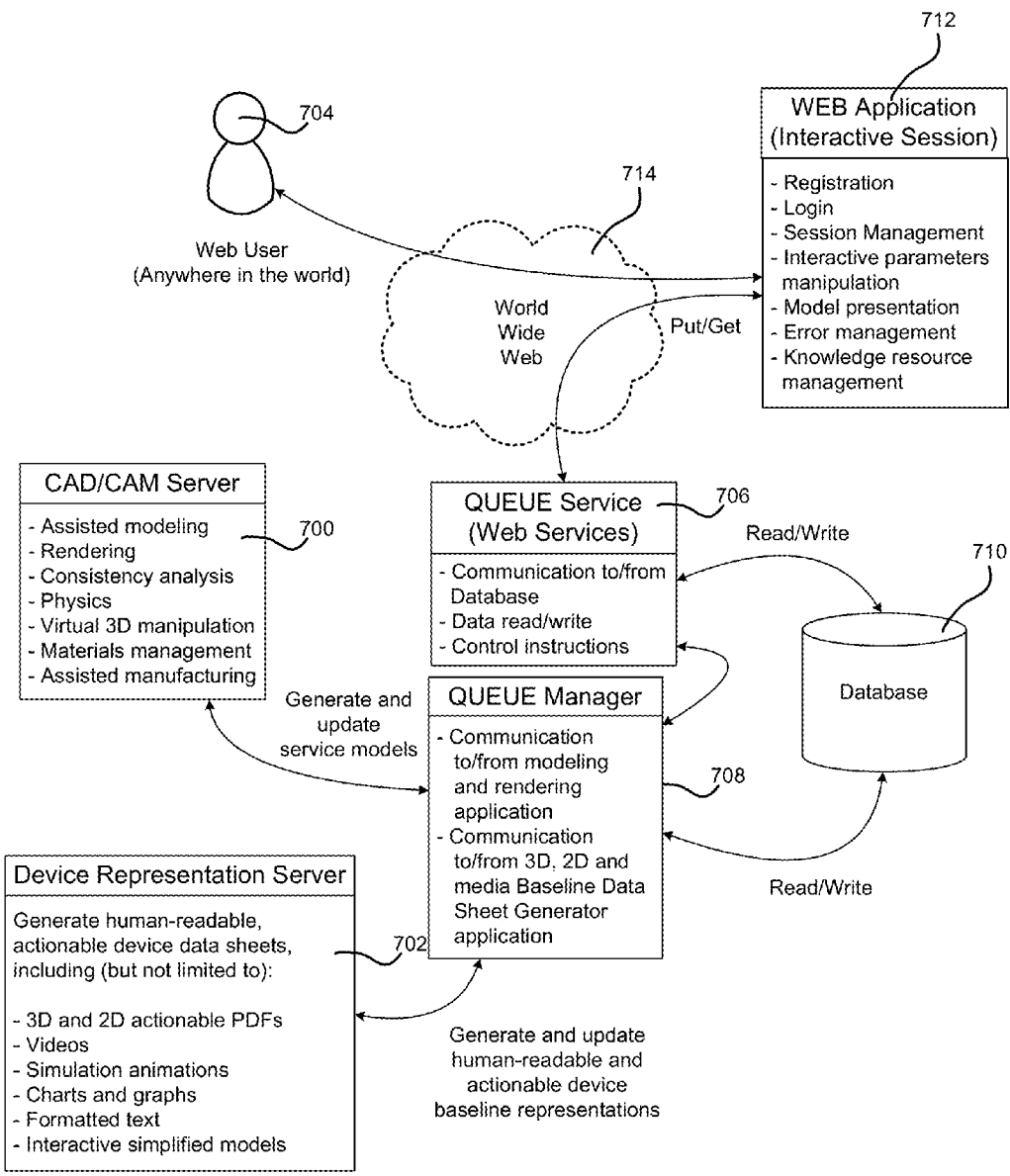
FIG. 7 is a flow chart illustrating interaction between web enabled user interface, queuing system, CAD system update, and output of results according to certain aspects of the invention.

Turning to FIG. 7, the interaction of the user with the queuing system, CAD system update, and output of results will be described. User 704 can access the system using any wired or wireless network. User 704 may interact with the system using a desktop computer and portable computing device, a telephone, a smartphone, a tablet computer, a media player, a gaming device or any other suitable computing device. In the example, the user communicates through the World Wide Web 714. An interface application 712 may be executed on a server, on the user device or on some combination of server and client devices. Interface 712 can transmit and receive information through a queue service that receives, schedules and marshals data communications for a plurality of users 704. A separate queue manager 708 may be used to direct operation of queue service 706, particularly where modeling and simulation graphics are to be scheduled for transmission to the user devices. For example, manager 708 may compress and reschedule image transmissions based on the capabilities of the user device. Network systems may provide various services to end-users. For example, CAD/Cam server 700 may perform design tasks and prepare manufacturing data for transmission to manufacturing devices. Additionally, a device representation server 702 may be employed to convert design data from CAD/CAM server 700 in human-readable form by, for example, rendering graphics, generating animations and simulation. Database 710 may be used to store baseline images, user biometrics and identification and to track inputs from a community of users.

FIG. 8 illustrates an iteratively and collectively designed/customized device, showing the variety of inputs provided and considered in creating a design according to certain aspects of the invention.

Figure 9:
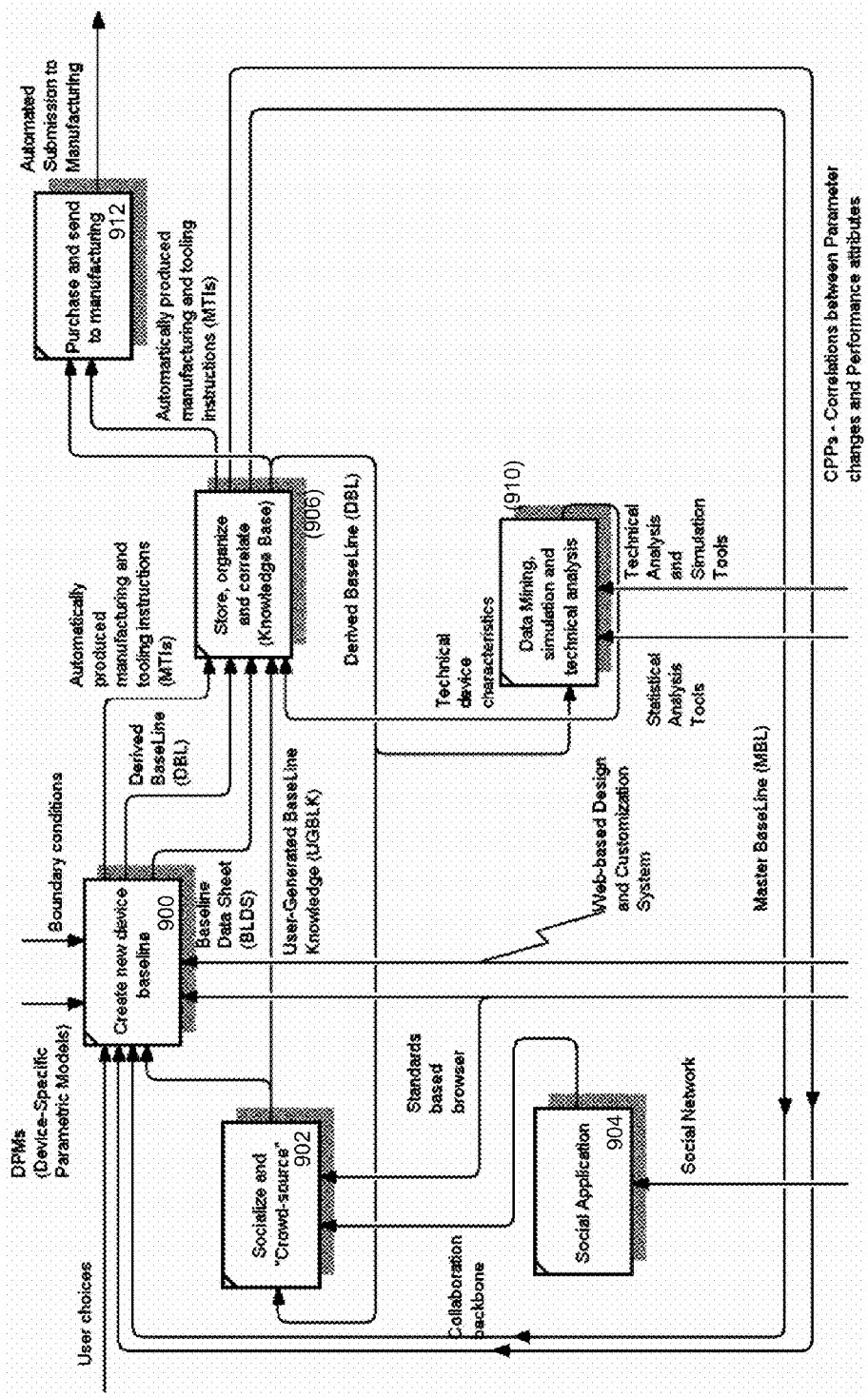
FIG. 9 is a flow chart that illustrates an iteratively and collectively designed/customized device utilizing knowledge bases, social networks, crowdsourcing, data mining and technical analysis.

FIG. 9 is a flow chart that illustrates an iteratively and collectively designed/customized device utilizing knowledge bases, social networks, crowdsourcing, data mining and technical analysis. At step 900, an initial device baseline may be created by experts and professional designers using expert user input and prior designs. This engineered initial baseline may be subjected to rigorous testing and/or to evaluation while in-use. Thereafter, a user may select the baseline to begin a customization. At step 906, design and manufacturing information for the baseline to assembled and stored. The baseline may be analyzed using standard or custom tools 910 that employ data mining and technical analysis processes. The results produce by tools 910 are used to update the baseline maintained at 906. At step 902, the baseline and associated information may be provided to plural users in a social network. The social network may have access to specialized tools 904 to support the crowdsourcing applications used to improve the customized designs and baseline models. At step 912, a user may order a customized device, whereby the system may gather information related to the user's design, before creating manufacturing information and transmitting the design to a manufacturing process.

EXAMPLE

Surfboard

In one example, a surfer accesses his favorite surfboard maker's website. The surfer typically provides identification in a login process as a user of the design-to-order system. Upon authenticating the user, the system may list board models previously customized by the user, typically with historical information attached. The user may opt to choose a new model to customize, and can pick from a list of pictures of boards that are available to order using the design-to-order system. The user may select a model that most closely resembles a desired shape and general dimensions, or the user may choose to have a knowledge-based driven system provide guidance, typically using a set of choices that assists the user to determine an appropriate initial master. The user can typically indicate a skill level—for example, the user may be an advanced surfer possessing detailed knowledge of surfboard specifications. The user may then be presented with a new screen that prompts the user for input and that makes available a list of parameters which can be customized. Typically, more parameters are available to an advanced surfer that are available to a user having a low knowledge level of surfboard specifications. A list of the current model parameters can be listed to inform the user of current dimensions and the current volume. The dimensions can be changed in a variety of ways—keying in numbers, slider bars, clicking on up or down arrows to increment values up or down.

In the example, the user may decide to make the board 2 inches longer, a half inch wider, 0.302" thicker and add a little nose rocker. Changes at this stage may be visualized in 2D with one or more views displayed visually showing the effect of specified changes. Where computing capacity and performance permit, visualization in 3D can be supported and the visualizations may include effects of specified changes, which may be displayed interactively. One or all of the parameters can be modified before clicking the 'Update 3D Model' button. The 'Update 3D Model' button sends the data over the network (e.g. the Internet) to a server running a queuing system. The request is handled, and data is passed to a computer running a CAD system, the data is input to the CAD system, the model updates, and various forms of output are returned. An additional software system may be invoked to process the output from the CAD system into additional formats. The user determines which type of output to download or view. The user will likely want to view the updated customized model in a 3D viewer. Another piece of output returned may be data listing the new volume, center of gravity, and moments of inertia. The volume parameters is typically of particular interest to the user as it is a critical factor in determining how well the board will float the user, and consequently, is determinative of how easy it will be to catch waves on the board.

Typically, the user can also download the finite element mesh model, and submit it for computational fluid dynamics ("CFD") analysis. The user may choose a menu option to start up the interactive customization of the art and graphics while waiting for the results of the CFD analysis. The new 3D model is displayed in a 3D viewing window and the user may be presented with a library of existing art and graphics which can be dragged and dropped onto the board for visualization on the photorealistic image in real-time. The user may also upload custom artwork for application to the board. The user may opt to change from a single stringer board to one with 3 stringers. The user may add a classic 60's stripe pattern, and a cloth island scene patch to the front ⅓ of the nose on the deck. The results of the CFD analysis may provide a visual representation of the flow lines, which may confirm acceptability of the board if, for example, they look very much like the results of a previous well-performing board customized by the user. Accordingly, the user may order this new board, by clicking a button such as 'Buy Now,' for example. An itemized cost summary may appear to show all of the custom options and their respective costs along with the total cost. The system logs the user design-to-order data, the manufacturing data is updated and sent to the manufacturer along with email notification that this specific order has come in. The user may return to the initial design-to-order screen in order to request a comparison of the four boards now available in the system. The images of the boards can be presented along with a comparison of the dimensions of the boards. Upon logging off, the user may receive confirmation of the order, including delivery time and cost. Optionally, a graphical representation of the board may be provided and a summary of the performance analysis may also be provided.

One example of systems that may be combined to make up the overall design-to-order system can be: user interface web pages generated using html and Flash in an ASP.net framework. The web pages can be executed on various web enabled devices including a Dell laptop PC, a mobile phone such as an iPhone, and/or a slate computer. User input is sent over the internet via ASP.net to a server running a queuing system that also invokes a Siemens NX CAD modeling session, passes the user input parameters to the appropriate CAD model, updates the model, then generates the predetermined output. The Siemens NX CAD software can output 3D data in various forms including ICES and STEP, .prt and Parasolid, and lightweight 3D JT data. It can also output various images of combinations of views, as well as 2D drawings. A subsequent system such as Anark Core Server can use the output from the CAD system as input to generate additional types of visual output that may be viewed by common viewers or may also be utilized to facilitate comparison of master versus new baseline. Rapid prototype data can also be output. Other Siemens modules such as NASTRAN can output finite element model mesh data for structural analysis, and/or Advanced Simulation can perform various analyses. The CFD module can perform computational fluid dynamics analysis. A form of 3D data can be imported into an interactive rendering system such as those offered by 'mental images' and 'Bunkspeed' for modifying art and graphics. The CAM module can update toolpaths as geometry changes, and GCODE data can be output. The GCODE can be postprocessed for a specific machine such as a Haas GR 512 gantry router outfitted with specialized fixturing to hold surfboard blanks for machining. A comparison can be made of the surfboard to be machined with a library of surfboard blank geometry to determine the best blank choice to use to make the design-to-order board. Custom artwork can be printed on specialized cloth using digital pigment inks from Sawgrass Technologies using Roland printers.

System Description

Figure 3:
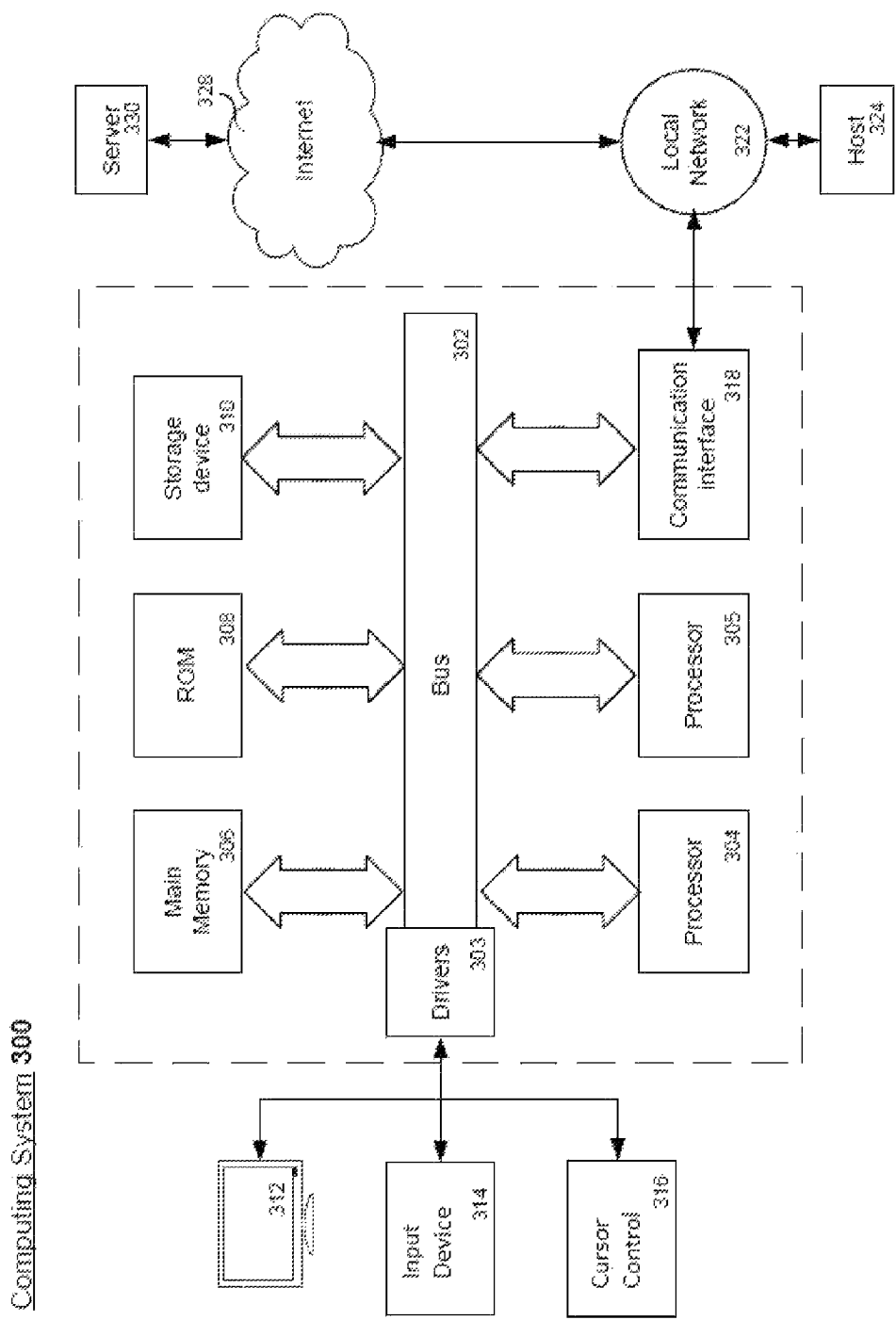
FIG. 3 is a simplified block drawing of a computer system that may be used for various purposes in certain embodiments of the invention.
Figure 4:
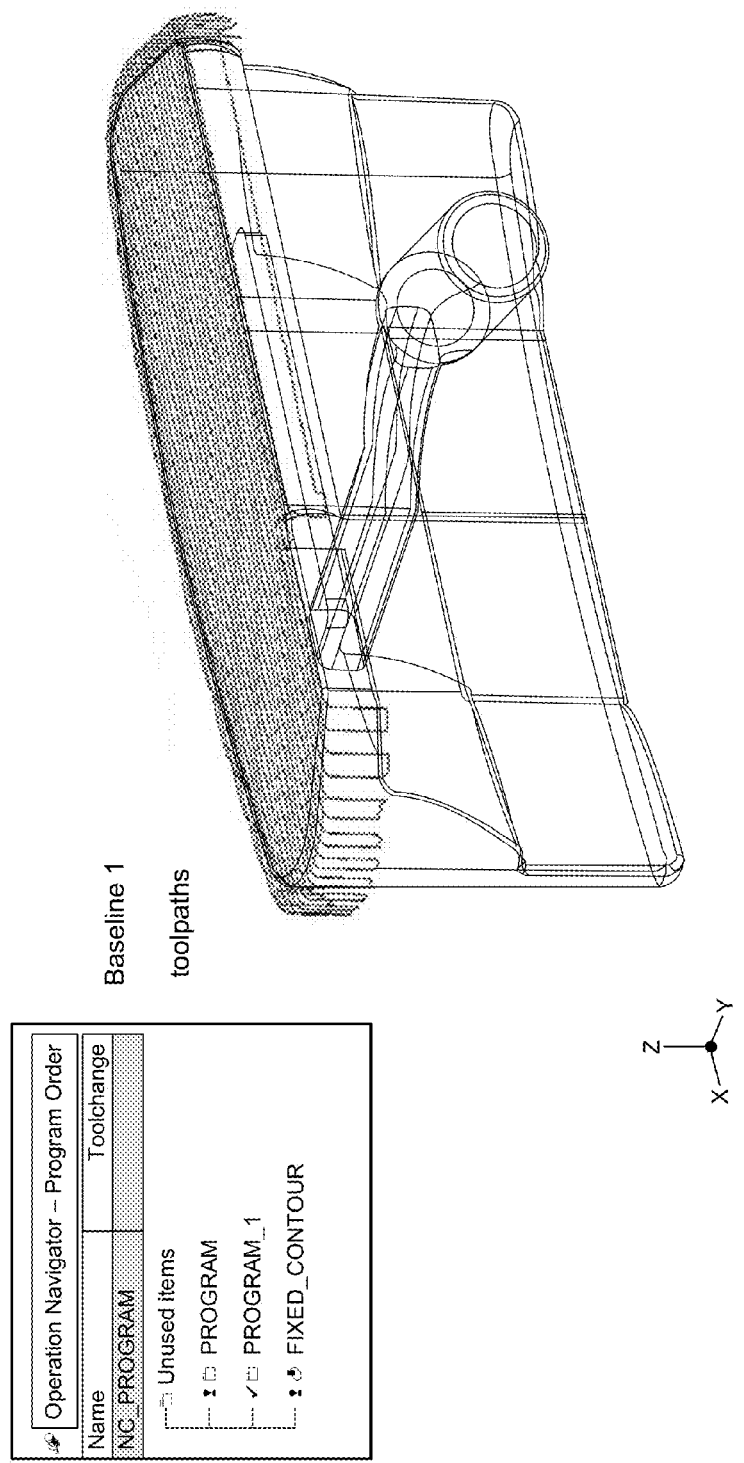
FIG. 4 illustrates the use of toolpaths to machine the face of a master putter.
Figure 5:
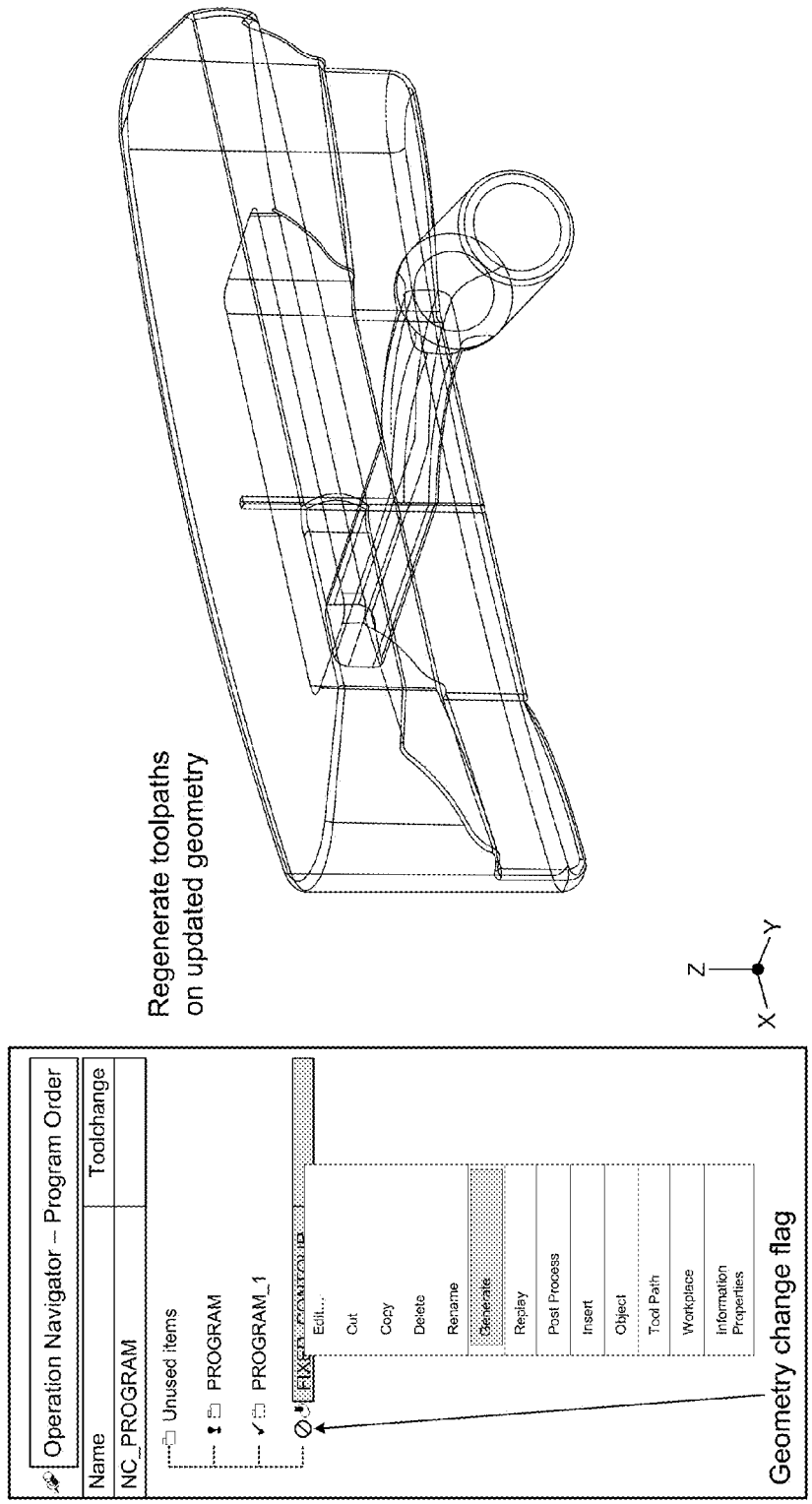
FIG. 5 illustrates CAM system flagging in which geometry has changed prior to toolpath is regeneration.

Turning now to FIG. 3, certain embodiments of the invention employ a processing system that includes at least one computing system 300 deployed to perform certain of the steps described above. Computing systems may be a commercially available system that executes commercially available operating systems such as Microsoft Windows®, UNIX or a variant thereof, Linux, a real time operating system and or a proprietary operating system. The architecture of the computing system may be adapted, configured and/or designed for integration in the processing system, for embedding in one or more of an image capture system, a manufacturing/machining system, a graphics processing workstation and/or a . . . . In one example, computing system 300 comprises a bus 302 and/or other mechanisms for communicating between processors, whether those processors are integral to the computing system 30 (e.g. 304, 305) or located in different, perhaps physically separated computing systems 300. Device drivers 303 may provide output signals used to control internal and external components Computing system 300 also typically comprises memory 306 that may include one or more of random access memory ("RAM"), static memory, cache, flash memory and any other suitable type of storage device that can be coupled to bus 302. Memory 306 can be used for storing instructions and data that can cause one or more of processors 304 and 305 to perform a desired process. Main memory 306 may be used for storing transient and/or temporary data such as variables and intermediate information generated and/or used during execution of the instructions by processor 304 or 305. Computing system 300 also typically comprises non-volatile storage such as read only memory ("ROM") 308, flash memory, memory cards or the like; non-volatile storage may be connected to the bus 302, but may equally be connected using a high-speed universal serial bus (USB), Firewire or other such bus that is coupled to bus 302. Non-volatile storage can be used for storing configuration, and other information, including instructions executed by processors 304 and/or 305. Non-volatile storage may also include mass storage device 310, such as a magnetic disk, optical disk, flash disk that may be directly or indirectly coupled to bus 302 and used for storing instructions to be executed by processors 304 and/or 305, as well as other information.

Computing system 300 may provide an output for a display system 312, such as an LCD flat panel display, including touch panel displays, electroluminescent display, plasma display, cathode ray tube or other display device that can be configured and adapted to receive and display information to a user of computing system 300. Typically, device drivers 303 can include a display driver, graphics adapter and/or other modules that maintain a digital representation of a display and convert the digital representation to a signal for driving a display system 312. Display system 312 may also include logic and software to generate a display from a signal provided by system 300. In that regard, display 312 may be provided as a remote terminal or in a session on a different computing system 300. An input device 314 is generally provided locally or through a remote system and typically provides for alphanumeric input as well as cursor control 316 input, such as a mouse, a trackball, etc. It will be appreciated that input and output can be provided to a wireless device such as a PDA, a tablet computer or other system suitable equipped to display the images and provide user input.

According to one embodiment of the invention, processor 304 executes one or more sequences of instructions. For example, such instructions may be stored in main memory 306, having been received from a computer-readable medium such as storage device 310. Execution of the sequences of instructions contained in main memory 306 causes processor 304 to perform process steps according to certain aspects of the invention. In certain embodiments, functionality may be provided by embedded computing systems that perform specific functions wherein the embedded systems employ a customized combination of hardware and software to perform a set of predefined tasks. One example is a numerically controlled machine that controls a cutting edge used to fashion a material according to a model provided by computing system 300. Thus, embodiments of the invention are not limited to any specific combination of hardware circuitry and software.

The term "computer-readable medium" is used to define any medium that can store and provide instructions and other data to processor 304 and/or 305, particularly where the instructions are to be executed by processor 304 and/or 305 and/or other peripheral of the processing system. Such medium can include non-volatile storage, volatile storage and transmission media. Non-volatile storage may be embodied on media such as optical or magnetic disks, including DVD, CD-ROM and BluRay. Storage may be provided locally and in physical proximity to processors 304 and 305 or remotely, typically by use of network connection. Non-volatile storage may be removable from computing system 304, as in the example of BluRay, DVD or CD storage or memory cards or sticks that can be easily connected or disconnected from a computer using a standard interface, including USB, etc. Thus, computer-readable media can include floppy disks, flexible disks, hard disks, magnetic tape, any other magnetic medium, CD-ROMs, DVDs, BluRay, any other optical medium, punch cards, paper tape, any other physical medium with patterns of holes, RAM, PROM, EPROM, FLASH/EEPROM, any other memory chip or cartridge, or any other medium from which a computer can read.

Transmission media can be used to connect elements of the processing system and/or components of computing system 300. Such media can include twisted pair wiring, coaxial cables, copper wire and fiber optics. Transmission media can also include wireless media such as radio, acoustic and light waves. In particular radio frequency (RF), fiber optic and infrared (IR) data communications may be used.

Various forms of computer readable media may participate in providing instructions and data for execution by processor 304 and/or 305. For example, the instructions may initially be retrieved from a magnetic disk of a remote computer and transmitted over a network or modem to computing system 300. The instructions may optionally be stored in a different storage or a different part of storage prior to or during execution.

Computing system 300 may include a communication interface 318 that provides two-way data communication over a network 320 that can include a local network 322, a wide area network or some combination of the two. For example, an integrated services digital network (ISDN) may used in combination with a local area network (LAN). In another example, a LAN may include a wireless link. Network link 320 typically provides data communication through one or more networks to other data devices. For example, network link 320 may provide a connection through local network 322 to a host computer 324 or to a wide are network such as the Internet 328. Local network 322 and Internet 328 may both use electrical, electromagnetic or optical signals that carry digital data streams.

Computing system 300 can use one or more networks to send messages and data, including program code and other information. In the Internet example, a server 330 might transmit a requested code for an application program through Internet 328 and may receive in response a downloaded application that provides for the anatomical delineation described in the examples above. The received code may be executed by processor 304 and/or 305.

ADDITIONAL DESCRIPTIONS OF CERTAIN ASPECTS OF THE INVENTION

The foregoing descriptions of the invention are intended to be illustrative and not limiting. For example, those skilled in the art will appreciate that the invention can be practiced with various combinations of the functionalities and capabilities described above, and can include fewer or additional components than described above. Certain additional aspects and features of the invention are further set forth below, and can be obtained using the functionalities and components described in more detail above, as will be appreciated by those skilled in the art after being taught by the present disclosure.

Certain embodiments of the invention provide a closed-loop feedback process for exploration, design and improvement of devices including performance devices. In certain embodiments, the systems and methods utilize crowdsourced knowledge bases, iterative improvements and centralized statistical, semantical and other technical analyses. Certain of these embodiments comprise a method for users and/or specialists to interactively modify a baseline design using a standards-compliant browser and a set of parametric specifications for the device baseline (i.e., the "master" baseline). In certain embodiments, a master baseline is a baseline that may be particularly desirable because of previous performance data. In certain embodiments, the baseline comprises a putter used by a top ranked golfer to win an important competition. In certain embodiments, the model is customized for suitability to specific types of users, including a surfboard for small-body users surfing a specific type of wave, or any other characteristic (e.g. a 16th century driver). In certain embodiments, create a new baseline is created that can be saved and recreated on demand by the user, as well as by other users and/or specialists.

Certain embodiments of the invention provide systems and methods for customizing a performance device. Certain of these embodiments comprise providing a baseline model defining modifications to a base device necessary to obtain a master device. In certain embodiments, the modifications includes at least one modification calculated to improve performance of the master device over the base device. Certain of these embodiments comprise receiving at least one change to a parameter of the baseline model from a customer. Certain of these embodiments comprise modifying a plurality of other parameters in the baseline model to obtain a customized device having the improved performance of the master device in response to the at least one changed parameter. Certain of these embodiments comprise generating manufacturing instructions, the instructions when executed by an automated production machine, causes the production machine to manufacture the customized device.

In certain embodiments, modifying the plurality of other parameters includes modifying certain of the other parameters based on information derived from tests performed on a different customized device. In certain embodiments, modifying the plurality of other parameters includes modifying certain of the other parameters based on information received from a community of users. In certain embodiments, the method further comprises providing the baseline model to the community of users. In certain embodiments, certain of the community of users create other customized devices from the baseline model. In certain embodiments, the information received from the community of users includes performance information obtained from the other customized devices. In certain embodiments, providing the baseline model to the community of users the method includes providing one or more of a device specification, a graphical representation of a customized device and a parametric report to the community of users. In certain embodiments, providing the baseline model to the community of users the method includes providing one or more of a virtual 3D instance of the model. In certain embodiments, providing the baseline model to the community of users the method includes providing metadata to the community of users, including one or more of a technical analysis, a hydrodynamic flow analysis, a computational fluid dynamics analysis and a finite element analysis. In certain embodiments, providing the baseline model to the community of users the method includes providing metadata to the community of users, including one or more of a recommendation derived from statistical analysis of sets of historic data provided by users.

In certain embodiments, the community of users communicates using a social network. In certain embodiments, the community of users share the baseline model and customizations of the baseline model. In certain embodiments, the information received from the community of users includes aggregated input from the community of users related to the baseline model and the customizations of the baseline model. In certain embodiments, the information received from the community of users includes aggregated input from the community of users related to the baseline model and the customizations of the baseline model. In certain embodiments, the manufacturing instructions comprise computer numerical control instructions. In certain embodiments, the manufacturing instructions cause the production machine to manufacture the customized device by additive fabrication. In certain embodiments, the manufacturing instructions include manufacturing-assistive information related to one or more of a tool path and an automated machining instruction.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense.

What is claimed is:

1. A method for customizing a performance device, the method being implemented in a computer system including one or more physical processors and storage media storing machine-readable instructions, the method comprising:
providing a baseline model defining a master device;
receiving at least one change to a parameter of the baseline model from a customer;
responsive to the at least one changed parameter, modifying a plurality of other parameters in the baseline model to obtain a customized version of the master device;
providing the baseline model to a community of users including providing metadata to the community of users, the metadata including one or more of a technical analysis, a hydrodynamic flow analysis, a computational fluid dynamics analysis, or a finite element analysis, and the provided metadata including a recommendation derived from statistical analysis of sets of historic data provided by users, wherein certain of the community of users create other customized devices from the baseline model; and
generating manufacturing instructions, the instructions when executed by an automated production machine, causes the production machine to manufacture the customized version of the master device.

2. A method according to claim 1, wherein modifying the plurality of other parameters includes modifying certain of the other parameters based on information derived from tests performed on a different customized version of the master device.

3. A method according to claim 1, wherein modifying the plurality of other parameters includes modifying certain of the other parameters based on information received from the community of users.

4. A method according to claim 3, wherein the information received from the community of users includes performance information obtained from the other customized versions of the master device.

5. A method according to claim 3, wherein the community of users communicates using a social network.

6. A method according to claim 5, wherein the community of users share the baseline model and customizations of the baseline model.

7. A method according to claim 6, wherein the information received from the community of users includes aggregated input from the community of users related to the baseline model and the customizations of the baseline model.

8. A method according to claim 1, wherein providing the baseline model to the community of users includes providing one or more of a device specification, a graphical representation of a customized version of the master device and a parametric report to the community of users.

9. A method according to claim 1, wherein providing the baseline model to the community of users includes providing one or more of a virtual 3D instance of the model.

10. A method according to claim 1, wherein the manufacturing instructions comprise computer numerical control instructions.

11. A method according to claim 10, wherein the manufacturing instructions cause the production machine to manufacture the customized version of the master device by additive fabrication.

12. A method according to claim 10, wherein the manufacturing instructions include manufacturing-assistive information related to one or more of a tool path and an automated machining instruction.

13. A method for customizing a performance device, the method being implemented in a computer system including one or more physical processors and storage media storing machine-readable instructions, the method comprising:
providing a baseline model defining a master device;
receiving at least one change to a parameter of the baseline model from a customer;
responsive to the at least one changed parameter, modifying a plurality of other parameters in the baseline model to obtain a customized version of the master device;
providing the baseline model to a community of users including providing metadata to the community of users, including one or more of a recommendation derived from statistical analysis of sets of historic data provided by users, wherein certain of the community of users create other customized devices from the baseline model; and
generating manufacturing instructions, the instructions when executed by an automated production machine, causes the production machine to manufacture the customized device.

14. A method according to claim 13, wherein modifying the plurality of other parameters includes modifying certain of the other parameters based on information derived from tests performed on a different customized version of the master device.

15. A method according to claim 13, wherein modifying the plurality of other parameters includes modifying certain of the other parameters based on information received from the community of users.

16. A method according to claim 15, wherein the information received from the community of users includes performance information obtained from the other customized versions of the master device.

17. A method according to claim 15, wherein the community of users communicates using a social network.

18. A method according to claim 17, wherein the community of users share the baseline model and customizations of the baseline model.

19. A method according to claim 18, wherein the information received from the community of users includes aggregated input from the community of users related to the baseline model and the customizations of the baseline model.

20. A method according to claim 13, wherein providing the baseline model to the community of users includes providing one or more of a device specification, a graphical representation of a customized version of the master device and a parametric report to the community of users.

21. A method according to claim 13, wherein providing the baseline model to the community of users includes providing one or more of a virtual 3D instance of the model.

22. A method according to claim 13, wherein the manufacturing instructions comprise computer numerical control instructions.

23. A method according to claim 22, wherein the manufacturing instructions cause the production machine to manufacture the customized version of the master device by additive fabrication.

24. A method according to claim 22, wherein the manufacturing instructions include manufacturing-assistive information related to one or more of a tool path and an automated machining instruction.

* * * * *